United States Patent
Nakami et al.

(10) Patent No.: US 7,719,574 B2
(45) Date of Patent: May 18, 2010

(54) OUTPUT IMAGE ADJUSTMENT OF IMAGE DATA

(75) Inventors: Yoshihiro Nakami, Nagano-ken (JP); Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 644 days.

(21) Appl. No.: 10/512,894

(22) PCT Filed: Jul. 11, 2003

(86) PCT No.: PCT/JP03/08874

§ 371 (c)(1),
(2), (4) Date: Jun. 14, 2005

(87) PCT Pub. No.: WO2004/008754

PCT Pub. Date: Jan. 22, 2004

(65) Prior Publication Data

US 2005/0231605 A1    Oct. 20, 2005

(30) Foreign Application Priority Data

Jul. 12, 2002    (JP) .............................. 2002-203582

(51) Int. Cl.
*H04N 5/235*    (2006.01)
*H04N 5/228*    (2006.01)

(52) U.S. Cl. .................. 348/221.1; 348/222.1

(58) Field of Classification Search ............. 348/222.1, 348/207.1, 229.1, 362, 333.01, 333.11, 221.1
See application file for complete search history.

(56) References Cited

U.S. PATENT DOCUMENTS

| | | | |
|---|---|---|---|
| 6,011,547 A | 1/2000 | Shiota et al. | |
| 6,567,119 B1 * | 5/2003 | Parulski et al. | ........... 348/207.2 |
| 6,882,754 B2 | 4/2005 | Hayashi | |
| 6,992,712 B2 * | 1/2006 | Yoshida | ...................... 348/243 |
| 7,023,484 B2 * | 4/2006 | Watanabe | .................... 348/364 |

(Continued)

FOREIGN PATENT DOCUMENTS

EP    1 187 068    3/2002

(Continued)

OTHER PUBLICATIONS

Abstract of Japanese Patent Publication No. 2000-261719, Pub. Date: Sep. 22, 2000, Patent Abstracts of Japan.

(Continued)

*Primary Examiner*—Lin Ye
*Assistant Examiner*—Amy Hsu
(74) *Attorney, Agent, or Firm*—Martine Penilla & Gencarella, LLP (57) ABSTRACT

A CPU 231 calculates modified brightness correction amount tCurve_Y with consideration of exposure correction amount (or exposure value) EV if photography information PI (or Exif IFD) is included in image data GF. Specifically, the modified brightness correction amount tCurve_Y is calculated by dividing original brightness correction amount tCurve_Yorg by $2^{|EV|}$. Therefore, it decreases in geometrical progression as the exposure correction amount increases. The CPU 231 applies the obtained modified brightness correction amount tCurve_Y to a tone curve to adjust image quality including brightness. More specifically, it uses the modified brightness correction amount tCurve_Y to modify the characteristics of the tone curve, and then uses the modified tone curve to adjust the image quality of the image data.

15 Claims, 8 Drawing Sheets

U.S. PATENT DOCUMENTS

| | | | | |
|---|---|---|---|---|
| 7,081,918 B2 * | 7/2006 | Takemoto | ................. | 348/223.1 |
| 7,129,980 B1 * | 10/2006 | Ashida | .................. | 348/333.04 |
| 7,145,597 B1 * | 12/2006 | Kinjo | ....................... | 348/222.1 |
| 7,199,823 B2 * | 4/2007 | Masuyama | ............... | 348/229.1 |
| 7,408,571 B2 * | 8/2008 | Tanaka et al. | ............ | 348/207.1 |
| 7,428,011 B1 * | 9/2008 | Hyodo et al. | ............ | 348/231.6 |
| 2002/0080406 A1 * | 6/2002 | Kulhalli et al. | ................. | 358/3 |

FOREIGN PATENT DOCUMENTS

| | | |
|---|---|---|
| JP | 2000-261719 | 9/2000 |
| JP | 2001-186297 | 7/2001 |
| JP | 2001-243463 | 9/2001 |
| JP | 2002-010108 | 1/2002 |

OTHER PUBLICATIONS

Abstract of Japanese Patent Publication No. 2001-186297, Pub. Date: Jul. 6, 2001, Patent Abstracts of Japan.

Abstract of Japanese Patent Publication No. 2001-243463, Pub. Date: Sep. 7, 2001, Patent Abstracts of Japan.

Abstract of Japanese Patent Publication No. 2002-010108, Pub. Date: Jan. 11, 2002, Patent Abstracts of Japan.

* cited by examiner

|  | BRIGHTNESS CORRECTION AMOUNT ||
|  | CONVENTIONAL METHOD | METHOD ACCORDING TO THIS EMBODIMENT |
| --- | --- | --- |
| NORMAL IMAGE QUALITY ADJUSTMENT | 16 | 16 |
| WITH CONSIDERATION OF EXPOSURE CORRECTION EV = −1.0 | 14 | 8 |
| WITH CONSIDERATION OF EXPOSURE CORRECTION EV = −2.0 | 11 | 4 |

OUTPUT IMAGE ADJUSTMENT OF IMAGE DATA

TECHNICAL FIELD

The present invention relates to an image adjustment technique of adjusting brightness of image data.

BACKGROUND OF THE INVENTION

The image quality of image data generated by a digital still camera (DSC), digital video camera (DVC), scanner or the like can be arbitrarily adjusted by use of an image-retouching application included in a personal computer. The image-retouching application is generally provided with an image adjustment function of automatically adjusting image quality (or characteristics) of image data, and this image adjustment function makes it possible to readily adjust image quality of image data to be output from an output device into normal image quality. The output device of image data includes, for example, a CRT, a printer, a projector, a television receiver, and the like.

The printer driver for controlling operations of printer, which is one of output devices, is also provided with a function of automatically adjusting image quality (or characteristics) of image data, and such printer driver makes it possible to readily adjust image quality of image data to be printed into normal image quality.

Typically, the automatic image quality adjustment function performed by the image-retouching application and the like performs image quality correction based on image quality of normal image data. However, since the image data subject to image processing can be generated under a variety of conditions, the automatic image quality adjustment function may result in poor image quality if the image quality (or characteristics) of image data is equally corrected using a reference value that is designed for the normal image data.

In addition, some image data generation devices such as DSC allow image quality of image data to be arbitrarily adjusted during generation of the image data, and the user can intentionally generate image data having a predetermined image quality. If the automatic image quality adjustment function is performed on such image data, intentional image characteristics of the image data are also adjusted equally based on the reference value. Thus, there is a problem that in such cases it is impossible to obtain an output image with the user's intention reflected thereon.

SUMMARY OF THE INVENTION

The present invention has been made in order to solve the above problems, and thus is intended to automatically adjust image quality of image data without diminishing an output tendency of intentional image processing performed on the image data.

In order to solve the above problems, a first aspect of the present invention provides an image processing apparatus for using image data and exposure correction amount for the image data to perform image processing on the image data. The image processing apparatus according to the first aspect of the present invention includes a correction amount determination module for determining brightness correction amount of the image data based on a brightness reference value that is used as a reference of image processing relating to brightness; a correction amount modification module for decreasing the brightness correction amount as the exposure correction value increases; and an image quality adjustment module for applying the modified brightness correction amount to adjust brightness of the image data.

The image processing apparatus according to the first aspect of the present invention determines brightness correction amount of image data based on a brightness reference value that is used as a reference of image processing relating to brightness, modifies the determined brightness correction amount smaller as the exposure correction amount increases, and applies the modified brightness correction amount to adjust brightness of the image data, and therefore enabling image quality of image data to be automatically adjusted without diminishing an intentional output condition relating to brightness. Consequently, even if image quality is automatically adjusted, it is possible to obtain a brighter output result when the output result is intended to be brighter, and to obtain a darker output result when the output result is intended to be darker.

In the image processing apparatus according to the first aspect of the present invention, the correction amount modification module may apply different degrees of change in the brightness correction amount to the exposure correction amount smaller than a predetermined exposure correction amount and the exposure correction amount larger than or equal to the predetermined exposure correction amount. Alternatively, the correction amount modification module may decrease the decreasing rate of the brightness correction amount as the exposure correction amount increases. Such configurations ensure maintenance of the tone in high light areas and shadow areas even if the exposure correction amount increases, and therefore preventing white clipping and black crushing.

In the image processing apparatus according to the first aspect of the present invention, the brightness correction amount may be decreased in geometrical progression. In such case, even if image quality is automatically adjusted, it is possible to obtain a brighter output result with more accuracy when the output result is intended to be brighter, and to obtain a darker output result with more accuracy when the output result is intended to be darker. For example, the correction amount modification module may modify the brightness correction amount by dividing the brightness correction amount by an exponential function that has the exposure correction amount as a parameter. In this case, the brightness correction amount can be decreased in geometrical progression as the exposure correction amount increases.

The image processing apparatus according to the first aspect of the present invention may further include a brightness characteristic value acquisition module for analyzing the image data to acquire a brightness characteristic value indicating characteristics of brightness of the image data, wherein the correction amount determination module determines the brightness correction amount so as to reduce a difference between the brightness reference value and the acquired brightness characteristic value. This enables characteristics relating to brightness of the image data to be more properly corrected in consideration of characteristics of each image data.

The image processing apparatus according to the first aspect of the present invention may further include an input module for inputting a tendency of brightness correction for the image data, wherein the correction amount determination module determines brightness correction amount of the image data based on the input tendency of brightness correction. This enables characteristics relating to brightness of the image data to be more properly corrected based on the input tendency of brightness correction.

The image processing apparatus according to the first aspect of the present invention may further include an image output module for using the brightness-adjusted image data to output an image. This enables the image having corrected characteristics of brightness to be output.

In the image processing according to the first aspect of the present invention, the correction amount modification module may modify the brightness correction amount in consideration of luminance deference between before and after contrast correction, and the image data and the exposure correction amount may be stored in a same file. This enables effects effect on brightness due to the contrast correction to be compensated. In addition, this facilitates the exposure correction amount being associated with the image data.

A second aspect of the present invention provides an image processing apparatus for using image data and information on exposure correction performed on the image data to perform image processing on the image data. The image processing apparatus according to the second aspect of the present invention includes: a brightness characteristic value acquisition module for analyzing the image data to acquire a brightness characteristic value indicating characteristics of brightness of the image data; an image quality adjustment module for reducing a difference between a brightness reference value that is used as a reference of image processing relating to brightness and the acquired brightness characteristic value; and a reduced difference amount adjustment module for decreasing a degree of reduction in the difference based on the information on exposure correction increases as a degree of exposure correction performed on the image data.

The image processing apparatus according to the second aspect of the present invention, when reducing a difference between a brightness reference value that is used as a reference of image processing relating to brightness and the acquired brightness characteristic value, decreases a degree of reduction in the difference based on the information on exposure correction as a degree of exposure correction performed on the image data increases, and therefore enabling image quality of image data to be automatically adjusted without diminishing an intentional output condition relating to brightness. Consequently, even if image quality is automatically adjusted, it is possible to obtain a desired brighter output result when the output result is intended to be brighter, and to obtain a desired darker output result when the output result is intended to be darker. The degree of reduction in the deference may be decreased in geometrical progression. In such case, it is possible to obtain a desired brighter output result with more accuracy when the output result is intended to be brighter, and to obtain a desired darker output result with more accuracy when the output result is intended to be darker.

The image processing apparatus according to the second aspect of the present invention may be configured as a method and a program in addition to the above configuration, and may take a variety of aspects as the image processing apparatus according to the first aspect of the present invention.

A third aspect of the present invention provides an image processing method for using image data and exposure correction amount for the image data to perform image processing on the image data. The image processing method according to the third aspect of the present invention includes the steps of: determining brightness correction amount of the image data based on a brightness reference value that is used as a reference of image processing relating to brightness; modifying the brightness correction amount smaller as the exposure correction amount increases; and applying the modified brightness correction amount to adjust brightness of the image data.

The image processing method according to the third aspect of the present invention provides the same functions and effects as the image processing apparatus according to the first aspect of the present invention. In addition, the image processing method according to the third aspect of the present invention may take a variety of aspects as the image processing apparatus according to the first aspect of the present invention.

A fourth aspect of the present invention provides a computer readable medium storing an image processing program for using image data and exposure correction amount for the image data to perform image processing on the image data. The image processing program stored in the computer readable medium according to the fourth aspect of the present invention causes the functions of: determining a brightness correction amount of the image data based on a brightness reference value that is used as a reference of image processing relating to brightness; modifying the brightness correction amount smaller as the exposure correction amount increases; and applying the modified brightness correction amount to adjust brightness of the image data.

The computer readable medium storing the image processing program according to the fourth aspect of the present invention provides the same functions and effects as the image processing apparatus according to the first aspect of the present invention. In addition, the computer readable medium storing the image processing program according to the fourth aspect of the present invention may take a variety of aspects as the image processing apparatus according to the first aspect of the present invention.

A fifth aspect of the present invention provides an image processing apparatus for performing image processing on image data associated with photography information indicating photography conditions at the time of shooting. The image processing apparatus according to the fifth aspect of the present invention includes: an image quality characteristic value acquisition module for analyzing acquired image data to acquire an image quality characteristic value indicating characteristics of image quality of the image data; a search module for searching the photography information associated with the acquired image data for photography information indicating an intention of photography; a image quality adjustment module for reducing a difference between a predetermined image quality adjustment reference value that is used as a reference of image quality adjustment and the acquired image quality characteristic value to adjust image quality of the image data; and a reduced difference amount adjustment module for using the searched photography information indicating an intention of photography to adjust a degree of reduction in the difference if the photography information indicating an intention of photography is detected.

The image processing apparatus according to the fifth aspect of the present invention can use photography information indicating an intention of photography among the photography information indicating the photography conditions at the time of shooting to adjust a degree of reduction in the difference during the image quality adjustment processing, and therefore enabling the image quality adjustment processing with the intention of photography reflected thereon.

In the image processing apparatus according to the fifth aspect of the present invention, if the photography information indicating an intention of photography is not detected, a degree of reduction in the difference may be not adjusted by use of the photography information indicating an intention of photography. In such case, the image quality adjustment processing can be performed without using photography information indicating an intention of photography.

The fifth aspect of the present invention may take aspects including a method and a recoding medium storing a program in addition to the above configuration.

BEST MODE FOR CARRYING OUT THE INVENTION

The image processing apparatus according to the present invention is described below based on embodiments with reference to the drawings.

A. Configuration of Image Processing System

Figure 1:
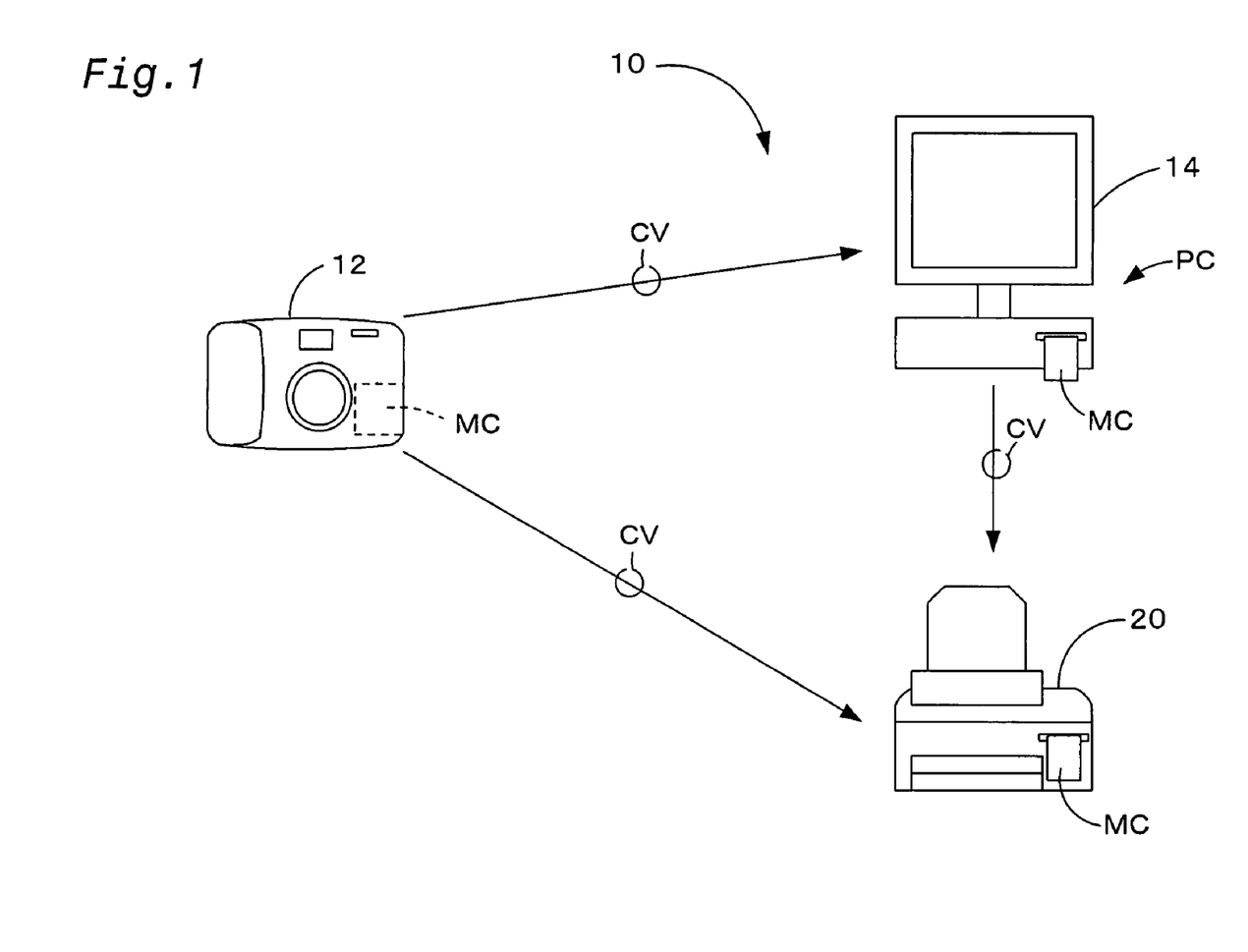
FIG. 1 is a schematic diagram that shows one example of image processing system to which an image processing apparatus according to one embodiment may be applied.
Figure 2:
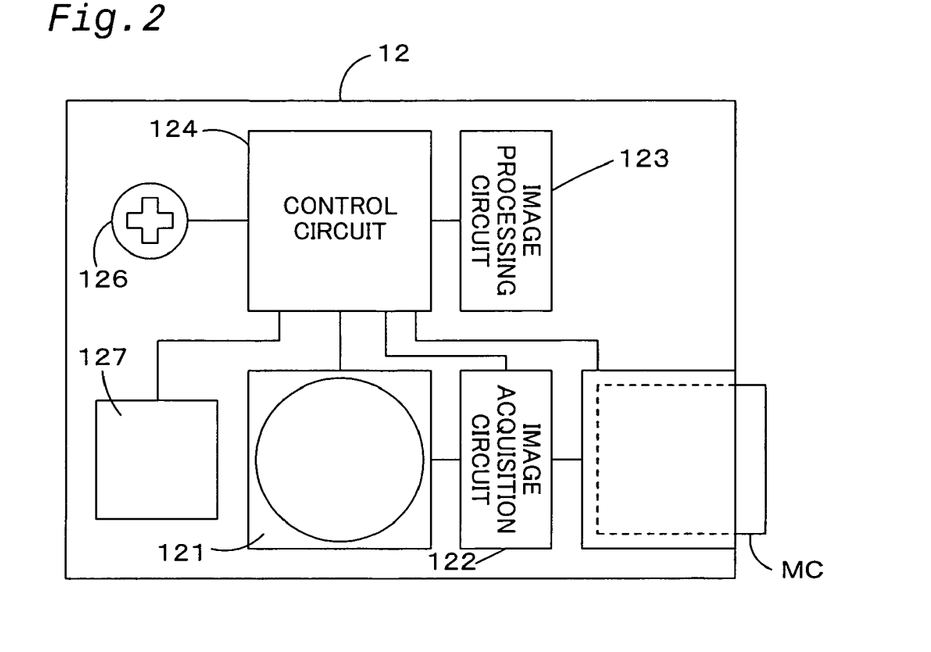
FIG. 2 is a block diagram that shows an outline configuration of a digital still camera capable of generating image data that may be processed by the image processing apparatus according to this embodiment.
Figure 3:
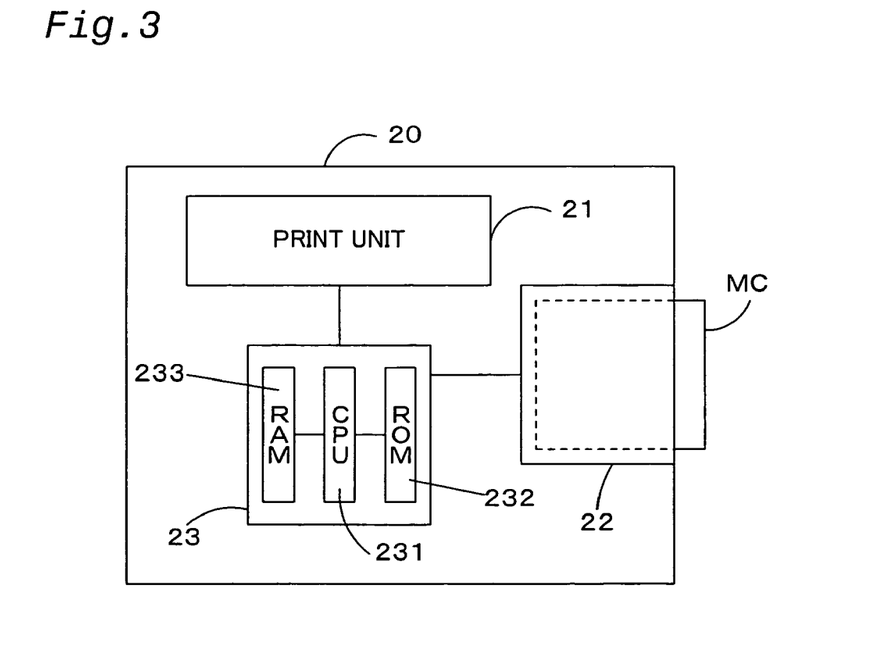
FIG. 3 is a block diagram that shows an outline configuration of a color printer that serves as the image processing apparatus according to this embodiment.

A configuration of an image processing system to which the image processing apparatus according to this embodiment may be applied is described with reference to FIGS. 1 through 3. FIG. 1 is a schematic diagram that shows one example of image processing system to which the image processing apparatus according to this embodiment may be applied. FIG. 2 is a block diagram that shows an outline configuration of a digital still camera capable of generating image data that may be processed by the image processing apparatus according to this embodiment. FIG. 3 is a block diagram that shows an outline configuration of a color printer that serves as the image processing apparatus according to this embodiment.

An image processing system 10 includes a digital still camera 12 as an input device for generating image data, a personal computer PC as the image processing apparatus for performing image processing on the image data generated by the digital still camera 12, and a color printer 20 as an output device for outputting an image. Although the output device may include a monitor 14 such as CRT display and LCD display, a projector, and the like as well as the printer 20, the color printer 20 is used as the output device in the following description.

The digital still camera 12 electrically acquires an image by causing optical information to form the image in a digital device (e.g. a CCD or photomultiplier tube), and includes an optical circuit 121 that has the CCD or the like for collecting optical information, an image acquisition circuit 122 for controlling the optical circuit 121 to acquire the image, an image processing circuit 123 for processing the acquired digital image, and a control circuit 124 that has a memory for temporarily storing each data and controls each of the circuits as shown in FIG. 2. The digital still camera 12 stores the acquired image as digital data into a storage device such as memory card MC. Although the storage format of image data in the digital still camera 12 is generally JPEG format, other storage formats such as RAW, TIFF, GIF, and BMP formats may also be used.

The digital still camera 12 includes a selection/decision button 126 for setting a shooting mode, exposure correction amount (or exposure correction value), light source, and the like, and a liquid crystal display 127 for previewing shot images and for setting the exposure correction amount and the like using the selection/decision button 126. Since the digital still camera 12 automatically sets a proper exposure, the exposure correction amount set in the digital still camera 12 is set as positive or negative correction amount relative to the proper exposure. The exposure correction amount, which is expressed in exposure value EV, is set to ±0 when the exposure is not corrected, is set to a positive value such as +0.1 EV and +2.0 EV when the exposure is corrected higher relative to the proper exposure, and is set to a negative value such as −0.1 EV and −2.0 EV when the exposure is corrected lower relative to the proper exposure.

The digital still camera 12 used within this image data output system 10 stores, in addition to image data GD, photography information PI for the image data as an image file GF into the memory card MC. More specifically, at the time of shooting, the photography information PI is automatically stored as the image file GF along with the image data GD into the memory card MC. For example, if photography parameters such as exposure correction amount, light source, and the like have been set to arbitrary values by the user, the image file GF including the image data GD generated according to the set exposure correction amount and the photography information PI in which the values of the set parameters are described is stored into the memory card MC.

The image file GF generated by the digital still camera 12 is transmitted to the color printer 20, for example, via a cable CV and the computer PC, or via the cable CV. Alternately, the image file is transmitted to the printer 20 via the computer PC having the memory card MC inserted in the memory card slot on which the image file GF was stored by the digital still camera 12, or via a direct connection of the memory card MC to the printer 20. In this embodiment, the description is made based on the case where the color printer 20 performs image processing and output (print) processing in stand-alone fashion.

The color printer 20 shown in FIG. 3 is capable of outputting color images, for example, a jet ink type printer which ejects inks of four colors including cyan (C), magenta (M), yellow (Y) and black (K) onto a printing medium to form a dot pattern and thus an image. Alternately, the color printer 20 may include an electro-photographic type printer which transfers and fixes color toner on a printing medium to form an image. In addition to the above four colors, the color inks may include light cyan (LC), light magenta (LM), and dark yellow (DY).

The color printer 20 includes a print unit 21 that has a print head, a rotating drum or the like and performs print processing on the printing medium, a slot 22 for containing the memory card MC, and a control circuit 23 for controlling an operation of each unit of the color printer 20. The control circuit 23 includes a central processing unit (CPU) 231 for performing a variety of arithmetic processing, a read-only memory (ROM) for storing in a nonvolatile fashion a program performed by the CPU 231 and other data, and a random access memory (RAM) 233 for temporarily storing a result of arithmetic processing performed by the CPU 231 and acquired data. The control circuit 23 analyzes the photography information PI read out from the memory card MC to control operations of a paper feed motor, a carriage motor, a print head, and the like (not shown) based on the analyzed photography information PI.

B. Configuration of Image File

The image file GF according to this embodiment can have, for example, a file structure according to an image file format standard (Exif) for digital still cameras. The specifications of Exif files, which are established by Japan Electronics and Information Technology Industries Association (JEITA), include a JPEG-Exif file in which the image data is stored as JPEG data of compressed type and a TIFF-Exif file in which the image data is stored as TIFF data of uncompressed type. In the following description, the compressed file or JPEG-Exif file is used.

Figure 4:
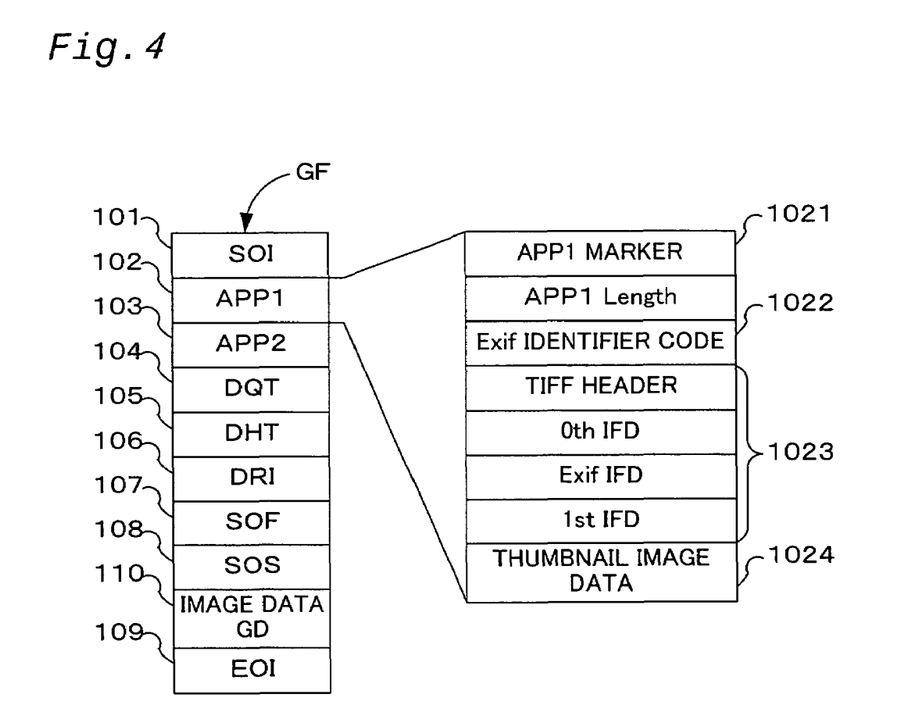
FIG. 4 is a schematic diagram that shows an internal structure of an image file GF in the Exif format.

The outline configuration of the image file in the Exif format that may be used in this embodiment is described with reference to FIG. 4. FIG. 4 is a schematic diagram that shows an internal structure of the image file GF in the Exif format. The terms such as file structure, data structure, and storage area in this embodiment depict images of file, data or the like that is stored within the storage device.

The image file GF includes a SOI marker segment 101 indicating a start of the compressed data, an APP1 marker segment 102 storing Exif attribute information, an APP2 marker segment 103 storing Exif extended information, a DQT marker segment 104 defining a quantization table, a DHT marker segment 105 defining a Huffman table, a DRI marker segment 106 defining an interval at which restart markers are inserted, a SOF marker segment 107 indicating a variety of parameters relating to frames, a SOS marker segment 108 indicating a variety of parameters related to scans, and an EOI marker segment 109 indicating an end of the compressed data. The compressed data GD is stored in an image data storage area 110 between the SOS marker segment 108 and the EOI marker segment 109. The sequence in which the marker segments are recorded is arbitrary as long as the APP1 and then the APP2 marker segments are recorded just after the SOI marker segment and the SOS marker segment is recorded across the image data just before the EOI marker segment.

The APP1 marker segment 102 consists of an APP1 marker 1021, an Exif identifier code 1022, attribute information 1023, and a thumbnail image 1024. The attribute information take a TIFF structure including a file header (or TIFF header), and in the case of Exif-JPEG include a 0th IFD for storing attribute information relating to the compressed image data, an Exif IFD for storing Exif-specific attribute information such as the photography information PI, and a 1st IFD for storing attribute information relating to the thumbnail image. The Exif IFD is pointed to by the offset from the TIFF header stored in the 0th IFD. The IFDs use a tag to identify each information, which may be represented by a tag name.

The photography information PI is information (or image quality generation information) relating to image quality when the image data was generated (or shot) by an image data generation device such as the digital still camera 12, and may include parameters relating to the exposure time, the ISO sensitivity, the aperture, the shutter speed and the focus distance which are automatically recorded at the time of shooting, and parameters relating to the exposure correction amount, the light source, the shooting mode, and the like which are arbitrarily set by the user.

Figure 5:
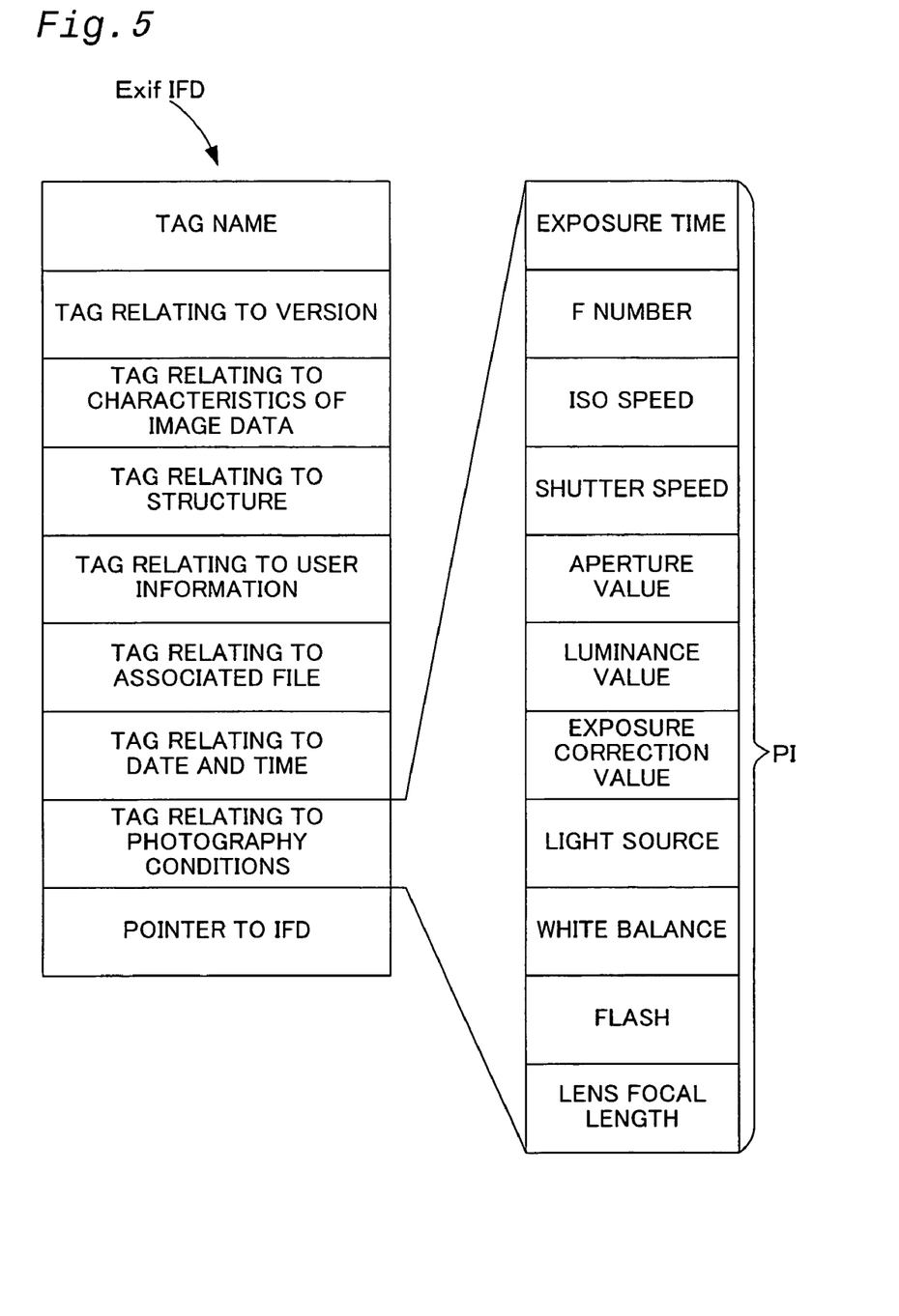
FIG. 5 is a schematic diagram that shows one example of detailed attribute information stored in the Exif IFD of the image file GF that may be used in this embodiment.

The detailed attribute information stored in the Exif IFD are described with reference to FIG. 5. FIG. 5 is a schematic diagram that shows one example of the detailed attribute information stored in the Exif IFD of the image file GF that may be used in this embodiment.

The Exif IFD stores tags of Exif version information, color space information, date and time of image data generation, and photography conditions. The tag relating to photography conditions (or photography information) stores parameter values such as exposure time, lens F number, exposure control mode, ISO sensitivity, exposure correction amount, light source, white valance, flash, focus distance, and the like according to predetermined offsets. The image processing apparatus (or output device) can specify an offset corresponding to a desired tag information (or parameter) to acquire a desired photography information PI.

C. Image Processing by Color Printer 20

Figure 6:
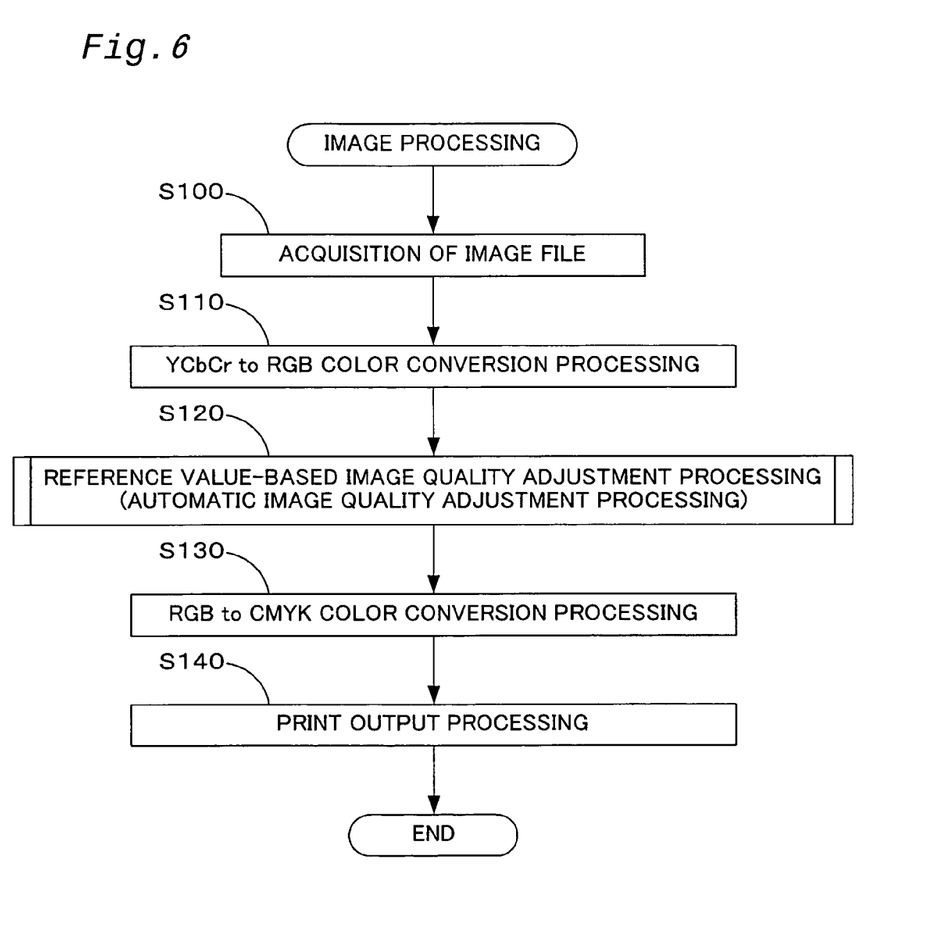
FIG. 6 is a flowchart that shows a processing routine of image processing performed by the color printer 20 according to this embodiment.
Figure 7:
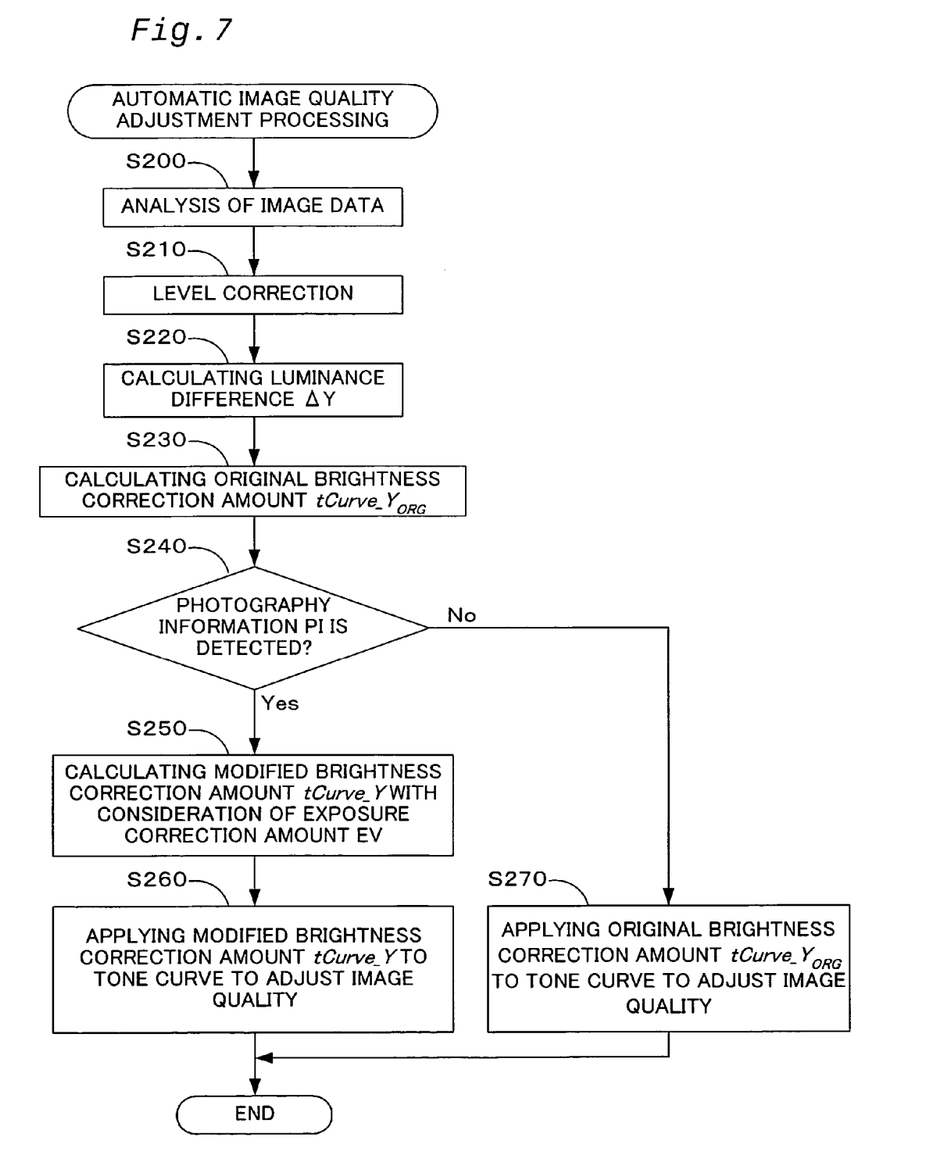
FIG. 7 is a flowchart that shows a processing routine of reference value-based automatic image quality adjustment processing performed by the image processing apparatus (or color printer 20) according to this embodiment.
Figure 8:
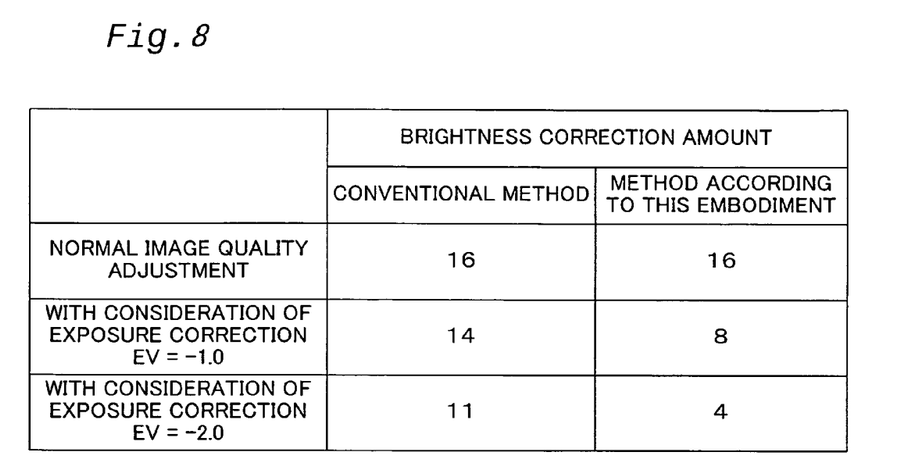
FIG. 8 is a schematic diagram that shows the comparison of brightness correction amount of the conventional method with that of the method according to this embodiment.

The image processing performed by the color printer 20 is described below in detail with reference to FIGS. 6 through 8. FIG. 6 is a flowchart that shows a processing routine of the image processing performed by the image processing apparatus (or color printer 20) according to this embodiment. FIG. 7 is a flowchart that shows a processing routine of reference value-based image quality adjustment processing (or automatic image quality adjustment processing) performed by the image processing apparatus (or color printer 20) according to this embodiment. FIG. 8 is a schematic diagram that shows the comparison of brightness correction amount of the conventional method with that of the method according to this embodiment.

When the memory card MC is inserted into the slot 22, the control circuit 23 (or CPU 231) of the color printer 20 reads out the image file GF from the memory card MC, and temporarily stores it into the RAM 233 (step S100). The CPU 231 expands the image data GD contained in the read image file GF, and then performs a matrix calculation with a matrix S on the expanded image data GD to perform YCbCr to RGB color conversion processing (step S110).

As described above, the image file GF in this embodiment stores image data in JPEG file format as the image data GD, and the image data in JPEG file format is compressed YCbCr data. Recently, image processing performed by personal computers PC and printers generally uses RGB data. Therefore, it is necessary to expand (or decode) the image data in JPEG file format and to perform color conversion processing from YCbCr data to RGB data. The matrix S is generally used to convert YCbCr data into RGB data in JFIF format that establishes specifications of JPEG file, and is not described any further since it is well known to a person skilled in the art.

The CPU 231 performs the reference value-based image quality adjustment processing on the RGB data obtained through the conversion (step S120). The reference value-based image quality adjustment processing, which is generally referred to as automatic image quality adjustment processing, does not depend on external input and uses preferred normal parameter values (or reference values) stored within the ROM 232 in advance to adjust image quality. The parameters used for this image quality adjustment include, for example, parameters relating to image quality such as brightness, sharpness, and the like, and normal parameter values relating to these parameters are used to calculate correction amount, which is then applied to the image adjustment. The details will be described later with reference to FIG. 7.

The CPU 231 performs a color conversion processing to convert the image data (or RGB data) having undergone the automatic image quality adjustment processing into CMYK data (step S130). That is, the color system of the image data is converted into the CMYK color system used by the color printer 20 to perform print processing. Specifically, this conversion is performed using a look-up table that is stored in the ROM 232 and that associates the RGB color system with the CMYK color system.

When the CPU 231 completes the above image processing, it uses the obtained image data to perform print output processing (step S140), and then exits this processing routine. In the print output processing, the CPU 231 performs the halftone processing and the resolution conversion processing, and then sends the processed data in the form of raster data to the print unit 21.

The automatic image quality adjustment processing is described below in detail with reference to FIG. 7. The CPU 231 analyzes the image data (step S200). More specifically, in the automatic image quality adjustment processing according to this embodiment, the CPU analyzes the image data GD on a pixel-by-pixel basis to acquire a variety of characteristic parameter values indicating characteristics of the image data GD, such as image statistics of minimum luminance, maximum luminance, and brightness representative value. Since the image data GD is RGB data at this point of time, the minimum luminance Ymin, the maximum luminance Ymax, and the like are acquired using an equation of Y=0.30R+0.59G+0.11B.

The CPU 231 uses the minimum luminance Ymin and the maximum luminance Ymax to perform level correction (or contrast correction) (step S210). Specifically, given that the RGB components of the original image data GD are R, G, and B while the corrected RGB components are R', G', and B', the correction is performed on each pixel using an equation of (R', G', B')=255*(R, G, B)(Ymax−Ymin)−Ymin. The CPU 231 calculates luminance difference ΔY=Ymod−Yorg between the luminance value at the 128 point of the original image data (i.e. image data before the level correction) and the luminance value Ymod at the 128 point of the corrected image data (step S220). The 128 point is one of horizontal axis points (i.e. input values) of a tone curve where a horizontal axis represents input values of image data (i.e. original image data) and a vertical axis represents output values of image data (i.e. corrected image data). Although the level correction is performed after the conversion to RGB data, such processing may be performed using luminance components Y at the stage of YCbCr data.

The CPU 231 uses the following equation 1 to calculate original brightness correction amount (brightness correction amount without consideration of exposure correction amount) tCurve_Yorg (step S230).

$$tCurve\_Y_{ORG} = 2 * \sqrt{B_{ref} - B_{smp}} \quad \text{(Equation 1)}$$

For example, if the brightness reference value Bref is equal to 128 and the brightness representative value Bsmp obtained through the sampling (i.e. analysis) is equal to 56, tCurve_Yorg is equal to 16 as shown in FIG. 8. The brightness reference value Bref is, for example, 8-bit information that can take a value ranging from 0 to 255, and is set to 128 in this embodiment.

The CPU 231 determines whether or not the photography information PI (Exif IFD) is included in the image data GF (step S240), and if it determines that the photography information PI is included (Yes at step S240), then it calculates modified brightness correction amount tCurve_Y with consideration of the exposure correction amount (or exposure value) EV (step S250). The modified brightness correction amount tCurve_Y is calculated by the following equation 2.

$$tCurve\_Y = \frac{tCurve\_Y_{ORG}}{2^{|EV|}} + \Delta Y \quad \text{(Equation 2)}$$

Where the luminance deference ΔY is a correction term for compensating effect on the brightness of the image data GD due to the contrast (level) correction. If the luminance deference ΔY is opposite in sign to the exposure correction amount EV, the luminance difference ΔY=0 is used to calculate the modified luminance correction amount tCurve_Y In this case, since the photographer's intention relating to exposure is opposed to the direction of the automatic correction, the compensation value caused by the contrast correction is not applied so as to give preference to the photographer's intention.

The CPU 231 applies the obtained modified brightness correction amount tCurve_Y to the tone curve to adjust the image quality including the brightness (step S260), and then exits this processing routine. More specifically, it uses the modified brightness correction amount tCurve_Y to modify the characteristics of the tone curve, and then uses the modified tone curve to correct (or change) output values (or output level) of R, G, and B components of the image data GD for each pixel.

If the CPU 231 determines that the photography information PI is not included (No at step S240), it cannot make consideration of exposure correction amount (or exposure value) EV, and thus applies the original brightness correction amount tCurve_Yorg to the tone curve to adjust the image quality including the brightness (step S270) and then exits this processing routine.

Figure 9:
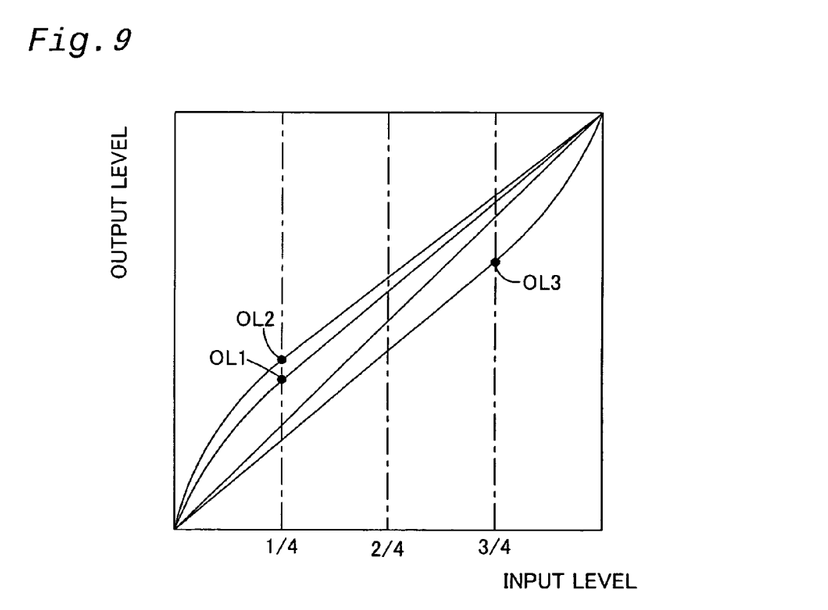
FIG. 9 is a schematic diagram that shows one example of tone curve modification performed during the brightness correction.

The modification of the tone curve characteristics using the modified brightness correction amount tCurve_Y or the original brightness correction amount tCurve_Yorg is performed, for example, as shown in FIG. 9. FIG. 9 is a schematic diagram that shows one example of tone curve modification performed during the brightness correction. If the exposure correction amount EV is a positive value, that is, the photographer desires to increase the brightness through the correction, output levels OL1 and OL2 are raised at the ¼ point of input level according to the brightness correction amount, for example. On the other hand, if the exposure correction amount EV is a negative value, that is, the photographer desires to decrease the brightness through the correction, the output level OL3 is lowered at the ¾ point of input level according to a corrected level, for example. Values other than the point corresponding to the corrected level are interpolated with a spline curve.

FIG. 8 shows the comparison of the brightness correction amount obtained by use of the color printer 20 according to this embodiment with those obtained by use of the conventional method. Here, the brightness correction of the conventional method is a method of calculating the brightness correction amount by changing the brightness reference value Bref according to the exposure correction amount EV in the above equation 1. For example, if a standard value of the brightness reference value Bref is equal to 128, the brightness reference value Bref is modified by calculating a value using a conversion equation of 0.1 EV=2 (brightness modification value) relative to the standard value and adding the calculated value to the brightness standard value of 128. More specifically, Bref='standard value'+(2×'exposure correction amount EV'/0.1), and therefore the brightness modification value is added to the standard value in the case of positive exposure correction amount EV while the brightness modification value is subtracted from the standard value in the case of negative exposure correction amount EV.

For example, if the brightness representative value Bsmp is equal to 56 and the exposure correction amount EV is equal to −1.0, the brightness reference value Bref is modified from 128 to 108, the modified brightness reference value causes the brightness correction amount to be equal to 14. In another example, if the brightness representative value Bsmp is equal to 56 and the exposure correction amount EV is equal to −2.0, the brightness reference value Bref is modified from 128 to 108, the modified brightness reference value causes the brightness correction amount to be equal to 11.

On the other hand, according to the color printer 20 of this embodiment, if the luminance difference $\Delta Y$ is equal to +5, the brightness representative value Bsmp is equal to 56, and the exposure correction amount EV is equal to −1.0, applying these values to the equation 2 causes the modified brightness correction amount to be equal to 8. In another example, if the luminance difference $\Delta Y$ is equal to +5, the brightness representative value Bsmp is equal to 56, and the exposure correction amount EV is equal to −2.0, applying these values to the equation 2 causes the modified brightness correction amount tCurve_Y to be equal to 4.

In this manner, the color printer 20 (or image processing apparatus) according to this embodiment can reflect the photography information PI contained in the image file GF to automatically adjust the brightness of image data GD. Therefore, if the user has arbitrarily set a tendency of image output, the automatic image adjustment processing is prevented from performing the image adjustment, and thereby ensuring the automatic image adjustment processing that reflects the user's intention.

In particular, the color printer 20 according to this embodiment corrects the brightness correction amount by dividing the brightness correction amount without consideration of the exposure correction amount EV by $2^{|EV|}$, and therefore can perform the brightness correction that is better adapted to the photographer's intention than the conventional method. That is, as the absolute value of the exposure correction amount increases, the modified brightness correction amount tCurve_Y can be significantly decreased in geometrical progression (or exponentially). Therefore, the color printer 20 can reflect the photographer's intention of brightening or darkening the output result on the output result of the image data with more accuracy.

In addition, the color printer 20 according to this embodiment corrects (or modifies) the brightness correction amount in consideration of the luminance difference $\Delta Y$ between before and after the contrast correction (or level correction), and therefore can compensate effect on the brightness due to the contrast correction. Therefore, if the contrast correction is performed, the brightness correction can be adapted to the photographer's intention.

Furthermore, the image quality can be automatically adjusted with the aid of the photography information PI contained in the image file GF, and therefore enabling the printing result of high quality on which the user's intention of the photograph is reflected to be readily obtained without performing image quality adjustment by use of a photo-retouching application or printer driver.

Other Embodiments

Figure 10:
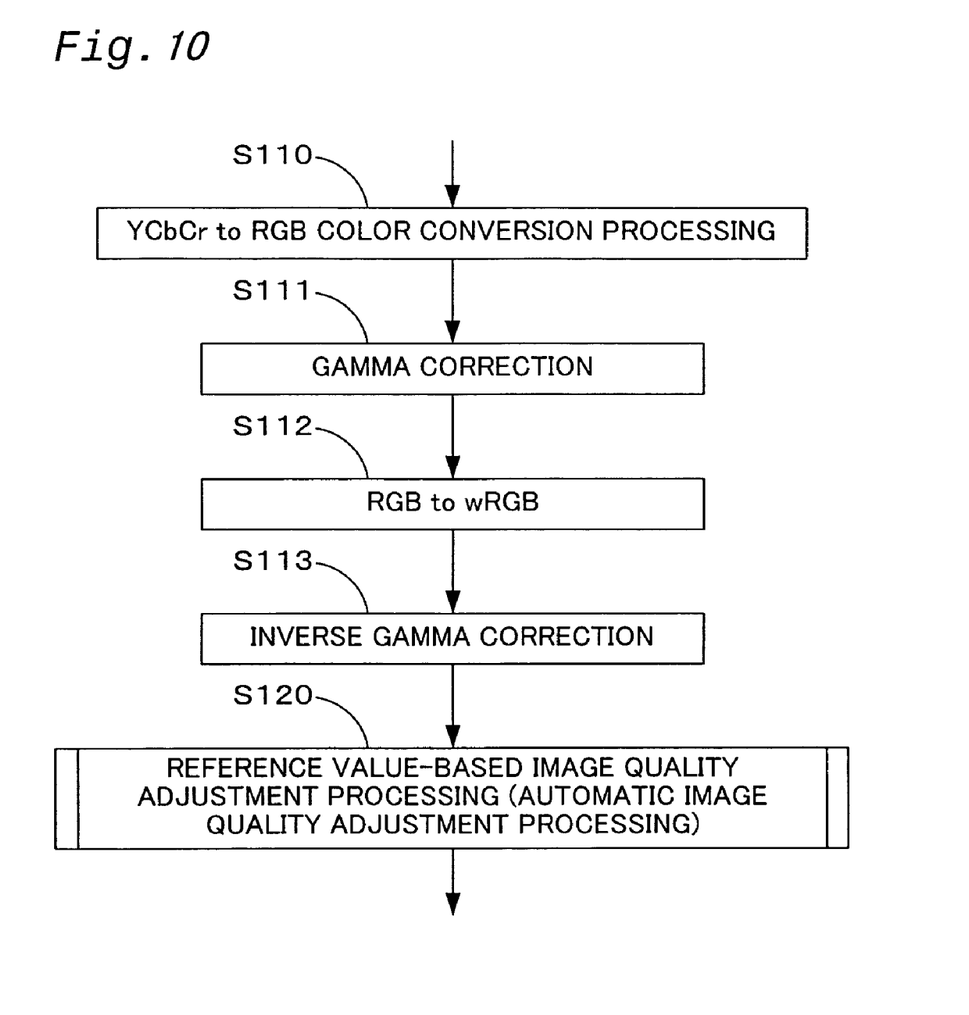
FIG. 10 is a flowchart that shows a processing routine of image processing added according to another embodiment.

Although the reference value-based image quality adjustment processing is performed after the YCbCr to RGB color conversion processing in the image processing of the embodiment described above, additional processing may be performed as shown in FIG. 10. FIG. 10 is a flowchart that shows a processing routine of image processing added according to another embodiment. Here, the steps including the YCbCr to RGB color conversion processing (step S110) and the preceding steps, and the steps including the reference-based image quality adjustment processing (step S120) and the following steps are not described since they have been described.

The CPU 231 performs the gamma correction on the image data converted to RGB data to linearize the image data prior to the following color conversion process (step S111). The gamma value used for the gamma correction is specific to the digital still camera, and may be acquired based on a parameter of the photography information PI or may be supplied as image processing information associated with the image data GD besides the photography information PI.

The CPU 231 uses a matrix to perform color conversion processing for converting RGB data into wRGB data (step S112). The wRGB color space has at least partly broader areas than the sRGB color space generally used, and preferably encompasses the sRGB color space. Using such wide RGB color space enables the CPU 231 to proceed to the subsequent automatic image quality adjustment processing without losing any value of the RGB data converted from YCbCr data. The matrix used for this color conversion is a combined matrix $N^{-1}M$ of a matrix such as matrix M for converting RGB data into XYZ data and a matrix such as matrix N for converting wRGB data into XYZ data, or a matrix M and a matrix $N^{-1}$.

The CPU 231 performs the inverse gamma correction on the image data converted to wRGB data (step S113). The gamma value used for this inverse gamma correction is specific to the color printer 20, and is stored in advance, for example, in the ROM 232. Such inverse gamma correction enables the image data GD to generated taking into account the gamma characteristic of the color printer 20.

The CPU 231 sequentially performs the automatic image quality adjustment processing (step S120) and the following steps described above. This embodiment enables the automatic image quality adjustment processing to be performed without losing any value of the RGB data converted from the YCbCr data, and therefore ensuring more proper image quality adjustment processing.

Although the image quality adjustment processing of brightness is automatically performed based on the single reference value in the embodiment described above, the color printer 20 may be provided on its control panel with automatic image quality adjustment buttons for selecting a tendency of brightness correction such as 'brighter' and 'darker' so that the brightness reference value Bref and thus the brightness correction amount are modified according to the tendency of brightness correction selected through such automatic image quality adjustment buttons.

Although the image quality adjustment processing is automatically performed in the embodiment described above, the color printer 20 may be provided on its control panel with automatic image quality adjustment buttons so that the automatic image quality adjustment processing of the above embodiments is performed only if the automatic image quality adjustment selected through such automatic image quality adjustment buttons is selected.

Although the color printer 20 performs the entire image processing without using the personal computer PC, and then forms a dot pattern onto the printing medium according to the generated image data GD in the embodiment described above, the computer may perform all or part of the image processing. This is actualized by providing the image processing functions described with reference to FIGS. 6 through 8 for image data processing applications such as retouching application and printer driver installed on a hard disk and the like of the computer. The image file GF generated by the digital still camera 12 is supplied to the computer via a cable or the memory card MC. On the computer, the user's operations cause the application to be activated, and then reading of the image file GF, analysis of the photography information PI, and conversion and adjustment of the image data GD to be performed. Alternatively, detecting the insertion of memory card MC or cable may cause the application to be automatically actualized, and then reading of the image file GF, analysis of the photography information PI, and conversion and adjustment of the image data GD to be automatically performed.

In addition, all or part of the image processing performed by the personal computer PC may be performed by the digital still camera 12. This is actualized by providing the image processing functions described with reference to FIGS. 6 through 8 for image data processing applications such as retouching application and printer driver stored on a ROM and the like of the digital still camera 12. Print data including print control commands and print image data generated by the digital still camera 12 is supplied to the printer 20 via a cable or the memory card MC. When the printer 20 receives the print data, it forms a dot pattern onto a printing medium according to the print image data to output an image. The digital still camera 12 may supply the print image data (image data having undergone the image processing) to the personal computer PC or the printer 20. In such case, the personal computer PC or the printer 20 provides the print image data with the print control commands.

Although the automatic image quality adjustment has been described with reference to the brightness correction considering the exposure correction amount in the embodiment described above, the automatic image quality adjustment can reflect the photography information PI on another characteristic parameter value of the image data GD such as shadow contrast point, contrast, color balance, saturation, and sharpness.

In addition, a characteristic parameter value on which the automatic image quality adjustment is performed may be selectable. For example, the color printer 20 is provided with selection buttons for selecting a parameter, or with selection buttons for selecting a shooting mode parameter in which predetermined parameters are combined based on an object of shooting so that the parameter on which the automatic image quality adjustment is performed is selected through these selection buttons. Alternatively, when the automatic image quality adjustment is performed by the personal computer, the parameter on which the automatic image quality adjustment is performed may be selected through a user interface of the printer driver or the retouching application.

Although the brightness correction amount is decreased in geometrical progression as the exposure correction amount increases in the embodiment described above, different degrees of change in the brightness correction amount may be applied to the exposure correction amount being smaller than a predetermined exposure correction amount and the exposure correction amount being larger than or equal to the predetermined exposure correction amount. Alternatively, the decreasing rate of brightness correction amount may be decreased as the exposure correction amount increases. In such cases, it is also possible to maintain the tone in high light areas and shadow areas even if the exposure correction amount increases, and therefore preventing white clipping and black crushing.

Although the color printer 20 is used as an output device in the embodiments described above, the output device may include display devices such as CRT, LCD, projector, and the like. In such case, the display device as the output device performs, for example, an image processing program (or display driver) for performing the image processing described with reference to FIGS. 6 through 8. Alternatively, if the CRT or the like serves as the display deice of the computer, the computer performs the image processing program. However, the image data that is finally output does not have a CMYK color space but a RGB color space.

In such case, the photography information PI at the time of image data generation can be reflected on a displaying result caused by the display device such as CRT and the like, as reflected on a printing result caused by the color printer 20. Therefore, this ensures more accurate display of the image data GD generated by the digital still camera 12.

Although the Exif format file is taken as a concrete example of image file GF in the embodiment described above, the format of image file according to the present invention is not limited to this format. That is, any image file may be used as long as it includes image data GD and information on exposure correction associated with the image data GD. The information on exposure correction may be the photography information PI of the image data or image processing control information for controlling the image processing apparatus in a more active manner. The parameters shown in FIG. 8 that are stored as the photography information PI in the above embodiment are only exemplary, and thus a variety of parameters according to Exif standard can be stored.

The digital still camera 12 and the color printer 20 used in the above embodiment are only exemplary, and thus their configurations are not limited to the details described with regard to each embodiment. The digital still camera 12 suffices as long as it has at least the function of generating the image file GF according to the above embodiment. The color printer 20 suffices as long as it is at least capable of analyzing the photography information PI of the image file GF according to this embodiment, automatically adjusting image quality with reflecting the user's intention especially relating to brightness, and outputting (or printing) the image.

Although the image data GD and the photography information PI are included in the same image file GF in the embodiment described above, the image data GD and the photography information PI are not necessarily stored in the same file. That is, it suffices to associate the image data GD with the photography information PI (or image processing control information). For example, it is applicable that association data are generated to associate image data GD with photography information PI (or image processing control information), one or more image data GD and photography information PI are stored into the respective separate files, and the associated photography information PI is referred in order to process the image data GD. In this case, during the image processing that uses the photography information PI, the image data and the photography information PI are inseparably related, and substantially have the same function as in the case where they are stored in the same file. In addition, the image file GF also includes a moving image file stored in an optical disk medium such as CD-ROM, CD-R, DVD-ROM, DVD-RAM, and the like.

Hereinabove the image processing apparatus according to the present invention has been described based on the several embodiments. However, the above embodiments of the invention are intended to facilitate a better understanding of the present invention and do not limit the present invention. The present invention may be modified and improved without departing from the spirit and the scope of claim for patent, and includes equivalents thereof.

What is claimed is:

1. An image processing apparatus for using image data and exposure correction amount for the image data to perform image processing on the image data, the image processing apparatus comprising:
a correction amount determination module configured to determine brightness correction amount of the image data based on a brightness reference value that is used as a reference of image processing relating to brightness;
a correction amount modification module configured to decrease the brightness correction amount as the exposure correction amount increases, wherein the exposure correction amount is associated with the image data in an image file; and
an image quality adjustment module configured to apply the modified brightness correction amount to adjust brightness of the image data,
wherein the correction amount modification module applies different degrees of change in the brightness correction amount to the exposure correction amount smaller than a predetermined exposure correction amount and the exposure correction amount larger than or equal to the predetermined exposure correction amount.

2. An image processing apparatus according to claim 1, wherein the correction amount modification module decreases the brightness correction amount in geometrical progression as the exposure correction amount increases.

3. An image processing apparatus according to claim 2, wherein the correction amount modification module divides the brightness correction amount by an exponential function that has the exposure correction amount as a parameter.

4. An image processing apparatus according to claim 3, further comprising:
a brightness characteristic value acquisition module configured to analyze the image data to acquire a brightness characteristic value indicating characteristics of brightness of the image data,
wherein the correction amount determination module determines the brightness correction amount so as to reduce a difference between the brightness reference value and the acquired brightness characteristic value.

5. An image processing apparatus according to claim 3, further comprising:
an input module configured to input a tendency of brightness correction for the image data,
wherein the correction amount determination module determines brightness correction amount of the image data based on the input tendency of brightness correction.

6. An image processing apparatus according to claim 4 or 5, further comprising:
an image output module configured to use the brightness-adjusted image data to output an image.

7. An image processing apparatus according to one of claims 1 and 2 through 5, wherein the correction amount modification module modifies the brightness correction amount in consideration of a luminance difference between before and after contrast correction, and the image data and the exposure correction amount are stored in a same file.

8. An image processing apparatus for using image data and information on exposure correction performed on the image data to perform image processing on the image data, the image processing apparatus comprising:
a brightness characteristic value acquisition module configured to analyze the image data to acquire a brightness characteristic value indicating characteristics of brightness of the image data;
an image quality adjustment module configured to reduce a difference between a brightness reference value that is used as a reference of image processing relating to brightness and the acquired brightness characteristic value; and
a reduced difference amount adjustment module configured to decrease a degree of reduction in the difference based on the information on exposure correction as a degree of exposure correction performed on the image data increases, wherein the information on exposure correction is associated with the image data in an image file,
wherein the reduced difference amount adjustment module applies a different degree of reduction in the difference to the degree of exposure correction smaller than a predetermined degree of exposure correction and the degree of exposure correction larger than or equal to the predetermined degree of exposure correction.

9. An image processing apparatus according to claim 8, wherein the degree of reduction in the difference is decreased by the reduced difference amount adjustment module in geometrical progression.

10. An image processing apparatus according to one of claims 8 and 9, wherein the image data and the information on exposure correction are stored in a same file.

11. A computer readable storage medium having an image processing program stored thereon, the image processing program including computer-executable instructions for using image data and exposure correction amount for the image data to perform image processing on the image data, the image processing program causing a computer to implement the functions of:
determining brightness correction amount of the image data based on a brightness reference value that is used as a reference of image processing relating to brightness;
modifying the brightness correction amount smaller as the exposure correction amount increases, wherein the exposure correction amount is associated with the image data in an image file; and
applying the modified brightness correction amount to adjust brightness of the image data,
wherein the function of modifying the brightness correction amount applies different degrees of change in the brightness correction amount to the exposure correction amount smaller than a predetermined exposure correction amount and the exposure correction amount larger than or equal to the predetermined exposure correction amount.

12. A computer readable storage medium according to claim 11, wherein the brightness correction amount is decreased in geometrical progression.

13. A computer readable storage medium according to claim 11, the image processing program further causing the computer to implement the function of:
analyzing the image data to acquire a brightness characteristic value indicating characteristics of brightness of the image data, wherein the function of determining the brightness correction amount determines the brightness correction amount so as to reduce a difference between the brightness reference value and the acquired brightness characteristic value, and the function of modifying the brightness correction amount divides the determined brightness correction amount by an exponential function that has the exposure correction amount as a parameter.

14. A computer readable storage medium according to claim 11, the image processing program further causing the computer to implement the function of:

inputting a tendency of brightness correction for the image data, wherein the function of determining the brightness correction amount determines the brightness correction amount of the image data based on the input tendency of brightness correction, and the function of modifying the brightness correction amount divides the determined brightness correction amount by an exponential function that has the exposure correction amount as a parameter.

15. A computer readable storage medium according to one of claims 11 and 12 through 14, the image processing program further causing the computer to implement the function of:

outputting the brightness-adjusted image data to an output device.

* * * * *